United States Patent Office 2,982,724
Patented May 2, 1961

2,982,724

HYDRAULIC FLUIDS FOR PRESSURE TREATMENT OF OIL BEARING FORMATION

Paul Gibson, Chicago, and Raymond W. Starmann, Evergreen Park, Ill., assignors to Swift & Company, Chicago, Ill., a corporation of Illinois No Drawing. Filed May 8, 1956, Ser. No. 583,353

11 Claims. (Cl. 252—8.55)

This invention in general relates to compositions for promoting gelation of petroleum oils, refined petroleum oil fractions, and triglyceride oils and to the gelled liquids, with particular reference to the application in techniques for hydraulic pressure treatment of subterranean formations. More particularly, the invention relates to liquid hydrocarbon and triglyceride gels and to improved gelling agents for the aforementioned gels, said gelling agents comprising higher aliphatic monocarboxylic acids in combination with a gelling agent improver, and to use of the gelled liquids in hydraulic pressure treatment of subterranean formations.

The process which has become known as hydraulic fracture, or hydrofracing as it is often called, of oil or gas bearing formations is achieved by exertion of increasing quantities of pressure on a liquid in the well bore until pressure is built up sufficiently to produce what is thought to be a fracture of the formation. It is generally accepted that fracture usually occurs along horizontal bedding planes where the tensile strength of the formation is usually the weakest, but occasionally, and particularly in no-stratified or unconsolidated formations, fracture is thought to occur along a vertical plane. In the process, the fluid is pumped into the well at a rate which causes the pressure to rise until there is a sharp break in pressure (in theory the point of fracture) after which the pressure remains fairly constant at a lower level as the fluid, in theory, penetrates the new crack. Thereafter, the pressure is relieved, and the well is put into production.

It has been established that the release of hydraulic pressure after the sharp break in pressure does not result in return of the formation to its original condition, but rather, the formation exhibits a substantial increase in permeability. However, it has been established that the permeability of the formation may be further increased by the use of oil-inert small particles such as sand, metal chips, crushed shell, etc. These particles are suspended in the hydraulic fluid. Under the fracture theory, they enter the formation with the fluid at the point of fracture. When the pressure is released and the fracturing fluid flows from the formation, these materials remain to prop the formation apart to some extent at the point of fracture.

The hydraulic fluids which are generally used are miscible with the interstitial crude oil, e.g., oily liquids, such as crude petroleum oils, a refined fraction of crude oils, e.g., gasoline, kerosene, diesel oil, naphtha, etc., and, much less often than the above, animal, vegetable and fish triglyceride oils. The viscosity of these fluids often is increased by the addition of other compositions to the base fluid. In the case of petroleum oils or its fractions, gelling agents, which tend to thicken the oil, enable the suspension of the small particles in the fluid. Soaps of fatty acids such as alkali metal soaps of red oil and tall oil fatty acids commonly are used as gelling agents in petroleum base fluids. In addition to alkali metal soaps, other fatty acid soaps of metals of the alkali metal and alkaline earth series, or polyvalent metals such as cadmium, mercury, cobalt, lead, nickel and aluminum have been suggested as gelling agents for petroleum base fluids.

After release of pressure, the gelled fluids must first be broken or their viscosity reduced before they may be easily removed from the formation and the well bore. There are several means for breaking the gel, among which are included the addition of a gel breaker or peptizer which may be incorporated in the fluid, said gel breaker becoming effective after a time delay. Certain other peptizing agents may be injected into the well prior to or after the hydraulic fluid. In some instances, the heat of the formation alone, particularly in deep wells, is sufficient to reduce the viscosity of the gel to a point where it may be removed by producing the well. Water soluble amines such as ethanolamine and other similar ammoniacal compounds have been suggested as effective gel breakers of soap-hydrocarbon gels. Other suitable materials are strong mineral acids. Another method of gel breaking is the addition of about 1 percent gel breaker (based on the volume of the fluid) dissolved in a suitable solvent such as gasoline which is then pumped into the well following the fracture liquid to reduce the viscosity or break the gel.

We are aware that the theory of hydraulic fracture is not universally accepted. There are those who propose that the fluid jets issuing from perforations in the casing at the pay zone etch cuts through the blocked area immediately surrounding the bore hole to the more permeable areas more remote from the bore. Others have proposed that the hydraulic fluid drives the water block immediately surrounding the hole into the more remote areas of the formation without actual fracture. Regardless of theory, it has been observed that the application of increasing pressure to a hydraulic fluid in the well bore results in a sharp break in pressure, after which the pressure levels off at a substantially constant lower level. This type of treatment of pay zones in general results in increased production of oil and/or gas. In view of the fact that the term "hydraulic fracture" has been widely accepted by those in the art to describe the foregoing process of well treatment, we shall employ the same terminology to describe the process of hydraulic pressure treatment with the understanding that we are not limited specifically to any particular theory.

The gels of the present invention are prepared by mixing the process of hydraulic pressure treatment with the understanding that we are not limited specifically to any particular theory.

The gels of the present invention are prepared by mixing the liquid hydrocarbon or triglyceride oil and about 0.5–3.0 percent of aliphatic, monocarboxylic acids and thereafter neutralizing the acids by adding caustic solution. The acids of the present invention broadly include aliphatic, monocarboxylic acids of a chain length of 14–24 and mixtures thereof. Tall oil fatty acids, which contain some abietic acid, are considered to be low grade liquid fatty acids for purposes of this invention. Other fatty acid mixtures within the scope of the present invention are red oil (oleic acid), vegetable oil fatty acids, and hydrogenated marine oil fatty acids. Gels of liquid hydrocarbons containing soaps of hydrogenated marine oil fatty acids as the gelling agent are included in the subject matter of a copending application of Charles S. Steiner and Paul Gibson, filed concurrently herewith, entitled "Liquid Hydrocarbon Gels and Uses Thereof."

This invention includes compositions for use in gelation which contain, in addition to the aforementioned acids, at least about one percent by weight of a gelling agent improver. The improver modifies the gel characteristics in that a more viscous gel is produced at a given concentration of soap. They may be normal aliphatic, monohydric alcohols (except methanol), polyhydric aliphatic alcohols, or certain surface active agents. The normal alcohols are preferably of the lower molecular weight range such as ethanol, n-propanol, n-butanol, etc., up to n-tetradecanol. The polyhydric alcohols include sorbitol, pentaerythritol, mannitol, polyoxyethylene glycol, glycols such as ethylene glycol and propylene glycol, and glycerol. In addition to the above, other compositions having hydrophilic and hydrophobic groups also improve gel characteristics. These surface active compositions include alkali metal salts of sulfated fatty acids, fatty acid monoesters of polyhydric alcohols such as glyceryl monostearin and glyceryl monoolein, and alkali metal salts of petroleum sulfonates. The alkali metal salts of sulfated fatty acids are prepared by neutralizing the sulfated fatty acid with the alkali metal hydroxide in only sufficient quantity to neutralize the sulfate group without appreciably neutralizing the carboxyl group. In all instances, maximum benefits in gel properties is achieved at concentrations of less than about 15 percent by weight of gelling agent improver. In general, the alcohols will vary between one and ten percent by weight, and the sulfonates, sulfates, and monoesters of polyhydric alcohols between five and fifteen percent by weight.

The following examples are illustrative of gelling agent compositions falling within the scope of our invention, it being understood that such examples are in nowise limitative of the scope of our invention. All parts are by weight.

*Example 1*

Menhaden oil fatty acids _____ 99
Sorbitol _____ 1

*Example 2*

Commercial tall oil fatty acids _____ 92
Sodium salt of sulfated red oil _____ 8

*Example 3*

Red oil (oleic acid) _____ 95
Pentaerythritol _____ 5

*Example 4*

Hydrogenated menhaden oil fatty acids _____ 90
Sodium salt of sulfated tallow acids _____ 10

*Example 5*

Hydrogenated menhaden oil fatty acids _____ 30–80
Rubber grade stearic acid _____ 60–10
Sodium salt of sulfated tallow acids _____ 10

*Example 6*

Hydrogenated whale blubber fatty acids _____ 95
Sodium salt of sulfated red oil _____ 5

*Example 7*

Hydrogenated seal oil fatty acids _____ 95
Glycerol _____ 5

*Example 8*

Tallow fatty acids _____ 90
Polyoxyethylene glycol (av. mol. wt. 400) _____ 10

*Example 9*

Hydrogenated herring oil _____ 92.5
Alkyl aryl sulfonate, sodium salt _____ 7.5

*Example 10*

Hydrogenated herring oil fatty acids _____ 97
n-Propanol _____ 3

*Example 11*

Commercial tall oil fatty acids _____ 65–30
Hydrogenated sardine oil fatty acids _____ 30–65
Sodium salt of sulfated red oil _____ 5

*Example 12*

Soybean oil fatty acids _____ 95
Sodium salt of sulfated red oil _____ 5

*Example 13*

Cottonseed oil fatty acids _____ 98
Mannitol _____ 2

*Example 14*

Hydrogenated tuna oil fatty acids _____ 90
Glyceryl mono-olein _____ 10

*Example 15*

Hydrogenated menhaden oil _____ 96
n-Decanol _____ 4

*Example 16*

Hydrogenated menhaden oil _____ 94
Commercial lauryl alcohol _____ 6

To further illustrate the invention, a single fatty acid mixture was used to prepare a gel, the viscosity of which was measured. Various gelling agent improvers of the present invention were mixed with the same fatty acid mixture, and the viscosities of gels made with these compositions was measured for comparative purposes.

*Example 17*

One percent by weight of hydrogenated menhaden oil fatty acids containing a gelling agent improver in the amount indicated below was added and mixed with 100 cc. of kerosene. The acids were saponified by adding to the mixture under vigorous agitation 0.8 cc. of 25 percent NaOH solution. The viscosity of the resulting gel was measured on a Brookfield viscosimeter using a #2 spindle at 10 r.p.m. The readings obtained with various compositions are tabulated below:

| Composition | Scale Reading | |
|---|---|---|
| | 2 min. agitation | 24 hrs. standing |
| A. Hyd. menhaden oil fatty acids | 22 | 64 |
| B. Comp. A+1% sorbitol | 40 | 136 |
| C. Comp. A+1% pentaerythritol | 46 | 144 |
| D. Comp. A+1% alkyl aryl sulfonate | | 232 |
| E. Comp. A+5% polyoxyethylene glycol (400) | 48 | 164 |
| F. Comp. A+5% sodium salt of sulfated red oil | 54 | 162 |

The percent of gelling agent improver is based on the weight of fatty acids.

The gels are made by adding the fatty acids, mixed with the gelling agent improvers of the instant invention, to the liquid to be gelled, the petroleum or triglyceride oil. The mixtures of acids and improvers, typified in Examples 1–16, constitute one embodiment of the instant invention. After the acids and improver have been mixed with the hydrocarbon or triglyceride, an excess of alkaline substance is added. When hydrogenated marine fatty acids are employed at levels of approximately 30% or above, the gels may be produced satisfactorily by addition of excess 25% NaOH solution. In other instances, 50% NaOH solution is recommended to achieve the most acceptable gel.

Obviously, the acid and gelling agent improver may be added sequentially to the liquid to be gelled without affecting the results obtained. Thirdly, the same improvement in gel properties may be achieved by saponifying the acids in the petroleum or triglyceride oil to form the gel, and thereafter adding the gelling agent improver to the gelled liquid.

The field use of the invention follows the same general pattern. The fluid to be gelled, generally a petroleum liquid hydrocarbon, containing sand, crushed shell, or other oil-inert small particles, is mixed in the pumper truck tanks with the acids, gelling agent improvers, and caustic in any of the orders described above. The resulting gel is then pumped into the well bore, and pressure is built up until at least there is a break in pressure.

Obviously, many modifications and variations of the invention as hereinbefore set forth may be made without departing from the spirit and scope thereof, and therefore only such limitations should be imposed as are indicated in the appended claims.

We claim:

1. A hydraulic fluid for high pressure treatment of oil and gas bearing formations which comprises: a liquid hydrocarbon gelled with a gelling agent comprising an alkali metal soap of aliphatic, monocarboxylic acids having a chain length between 14 and 24; an oil-inert, propping agent suspended therein; and at least one percent and not more than 15% by weight of said aliphatic acids of a gelling agent improver selected from the group consisting of, alkali metal salts of petroleum sulfonates, alkali metal salts of sulfated fatty acids, and fatty acid monoesters of polyhydric alcohols.

2. A hydraulic fluid for pressure treatment of oil and gas bearing formations which comprises: a liquid hydrocarbon gelled with a gelling agent comprising a soap of aliphatic, monocarboxylic acids having a carbon chain length between 14 and 24; an oil-inert propping agent suspended therein and 5–15 percent by weight of a gel improver selected from the group consisting of alkali metal salts of petroleum sulfonates, alkali metal salts of sulfated fatty acids, and fatty acid mono-esters of polyhydric alcohols.

3. The hydraulic fluid of claim 2 wherein said improver is an alkali metal salt of petroleum sulfonate.

4. The hydraulic fluid of claim 2 wherein said improver is an alkali metal salt of sulfated fatty acids.

5. The hydraulic fluid of claim 2 wherein said improver is a fatty acid mono-ester of a polyhydric alcohol.

6. The hydraulic fluid of claim 2 wherein said aliphatic acids are from a member of the group consisting of tall oil fatty acids, hydrogenated marine oil fatty acids, and red oil.

7. A hydraulic fluid for high pressure treatment of oil and gas bearing formations which comprises: a liquid hydrocarbon gelled with a gelling agent comprising 0.5–3.0 percent by weight of said hydrocarbon of an alkali metal soap of aliphatic, monocarboxylic acids having a carbon chain length between 14 and 24; an oil-inert propping agent suspended therein and 5–15 percent by weight of a gel improver selected from the group consisting of alkali metal salts of petroleum sulfonates, alkali metal salts of sulfated fatty acids, and fatty acid mono-esters of polyhydric alcohols.

8. The hydraulic fluid of claim 7 wherein said improver is an alkali metal salt of petroleum sulfonate.

9. The hydraulic fluid of claim 7 wherein said improver is an alkali metal salt of sulfated fatty acids.

10. The hydraulic fluid of claim 7 wherein said aliphatic acids are from a member of the group consisting of tall oil fatty acids, hydrogenated marine oil fatty acids, and red oil.

11. The hydraulic fluid of claim 7 wherein said improver is mono-esters of polyhydric alcohols.

References Cited in the file of this patent

UNITED STATES PATENTS

| Number | Name | Date |
|---|---|---|
| 2,032,826 | Ambrose et al. | Mar. 3, 1936 |
| 2,093,863 | Clarkson et al. | Sept. 21, 1937 |
| 2,130,664 | Berliner | Sept. 20, 1938 |
| 2,200,495 | Fife | May 14, 1940 |
| 2,268,234 | Adams et al. | Dec. 30, 1941 |
| 2,637,703 | Dixon et al. | May 5, 1953 |
| 2,667,457 | McChrystal | Jan. 26, 1954 |
| 2,724,439 | Brainerd | Nov. 22, 1955 |
| 2,779,735 | Brown et al. | Jan. 29, 1957 |
| 2,794,779 | Cardwell | June 4, 1957 |
| 2,825,409 | Ring | Mar. 4, 1958 |
| 2,838,116 | Clark | June 10, 1958 |
| 2,869,643 | Schuessler | Jan. 20, 1959 |

UNITED STATES PATENT OFFICE
CERTIFICATE OF CORRECTION

Patent No. 2,982,724  May 2, 1961

Paul Gibson et al.

It is hereby certified that error appears in the above numbered patent requiring correction and that the said Letters Patent should read as corrected below.

Column 1, line 18, for "the" read -- their --; line 36, for "no-stratified" read -- non-stratified --; column 2, line 49, beginning with "The gels of the present" strike out all to and including "particular theory." in line 52, same column 2; column 3, line 16, for "glycerly" read -- glyceryl --; column 4, line 8, for "faty" read -- fatty --.

Signed and sealed this 19th day of September 1961.

(SEAL)
Attest:

ERNEST W. SWIDER
Attesting Officer

DAVID L. LADD
Commissioner of Patents

USCOMM-DC